(12) United States Patent
Pope et al.

(10) Patent No.: US 8,991,743 B1
(45) Date of Patent: Mar. 31, 2015

(54) HELICOPTER WITH BLADE-TIP THRUSTERS AND ANNULAR CENTRIFUGAL FUEL SUPPLY TANK AND CONCENTRIC CABIN AND FUSELAGE

(71) Applicant: Charles Douglas Pope, Middleburg, FL (US)

(72) Inventors: Charles Douglas Pope, Middleburg, FL (US); Ralph Elliott, Jacksonville, FL (US)

(*) Notice: Subject to any disclaimer, the term of this patent is extended or adjusted under 35 U.S.C. 154(b) by 0 days.

(21) Appl. No.: 14/052,488

(22) Filed: Oct. 11, 2013

Related U.S. Application Data

(60) Provisional application No. 61/712,796, filed on Oct. 11, 2012.

(51) Int. Cl.
| | |
|---|---|
| *B64C 27/00* | (2006.01) |
| *B64C 39/00* | (2006.01) |
| *B64C 27/06* | (2006.01) |
| *B64C 27/08* | (2006.01) |
| *B64C 27/72* | (2006.01) |
| *B64C 27/82* | (2006.01) |
| *B64D 37/04* | (2006.01) |
| *B64D 37/06* | (2006.01) |

(52) U.S. Cl.
CPC ............... *B64C 39/001* (2013.01); *B64C 27/06* (2013.01); *B64C 27/08* (2013.01); *B64C 27/72* (2013.01); *B64C 27/82* (2013.01); *B64D 37/04* (2013.01); *B64D 37/06* (2013.01)
USPC ...................................... 244/17.11; 244/23 C

(58) Field of Classification Search
CPC ........ B64C 27/18; B64C 27/16; B64C 39/06; B64C 39/062
USPC ........ 244/23 C, 6, 7 R, 8, 17.11, 23 R, 17.17, 244/17.19
See application file for complete search history.

(56) References Cited

U.S. PATENT DOCUMENTS

| | | | | |
|---|---|---|---|---|
| 2,585,468 | A * | 2/1952 | Isacco | 244/17.11 |
| 2,740,595 | A * | 4/1956 | Bakewell | 244/17.11 |
| 2,862,680 | A * | 12/1958 | Berger | 244/17.17 |
| 2,920,841 | A * | 1/1960 | Junker | 244/4 R |
| 3,484,172 | A * | 12/1969 | Reed | 416/18 |
| 3,507,461 | A * | 4/1970 | Rosta | 244/17.23 |
| 3,559,922 | A * | 2/1971 | Gluhareff | 244/17.17 |
| 3,690,597 | A * | 9/1972 | Renato Di Martino | 244/23 C |
| 7,093,788 | B2 * | 8/2006 | Small et al. | 244/12.2 |
| 7,604,198 | B2 * | 10/2009 | Petersen | 244/17.23 |
| 2003/0136875 | A1 * | 7/2003 | Pauchard | 244/17.11 |

* cited by examiner

*Primary Examiner* — Tien Dinh
*Assistant Examiner* — Alexander V Giczy
(74) *Attorney, Agent, or Firm* — Mark Young, P.A.

(57) ABSTRACT

A helicopter includes a rotor with short blades and tip thrusters. The blades extend from an annular fuel tank that rotates with the blades. Centrifugal force propels fuel from the interior compartment of the annular tank, through conduits extending through the blades from root to tip, to the tip thrusters. Valves (e.g., solenoid valves and/or a flyweight governor) regulate fuel flow to achieve and maintain a determined steady rotational speed. A fuselage covered by a canopy is mounted atop a bearing on the annular fuel tank. The pitch of each blade may be adjusted collectively and cyclically using a swash ring and hydraulic linear actuators.

15 Claims, 14 Drawing Sheets

HELICOPTER WITH BLADE-TIP THRUSTERS AND ANNULAR CENTRIFUGAL FUEL SUPPLY TANK AND CONCENTRIC CABIN AND FUSELAGE

RELATED APPLICATION

This application is a nonprovisional of and claims the benefit of priority of U.S. Provisional Application No. 61/712,796 filed Oct. 11, 2012, the entire contents of which are incorporated herein by this reference.

FIELD OF THE INVENTION

This invention relates generally to aircraft, and, more particularly, to a helicopter with blade-tip thrusters and annular centrifugal fuel supply tank and concentric cabin and fuselage.

BACKGROUND

Conventional helicopters include elaborate and heavy engine and transmission systems to provide power to drive a rotor and anti-torque system and to transmit torque from an output shaft of the engine to main and tail rotor assemblies. Unfortunately, both the engine and transmission are heavy, bulky and inefficient due to frictional losses. The engine and transmission are also expensive and difficult to maintain.

Another shortcoming of conventional helicopters is instability. A tail rotor assembly or other comparable anti-torque system is required to stabilize the helicopter.

Another shortcoming of conventional helicopters is excessive drag. The conventional design of a bulbous fuselage below a rotor is far from sleek.

What is needed is an efficient helicopter that avoids conventional engines, transmissions and tail rotor assemblies, while providing a reduced drag configuration that achieves equivalent or superior performance to a conventional helicopter.

The invention is directed to overcoming one or more of the problems and solving one or more of the needs as set forth above.

SUMMARY OF THE INVENTION

To solve one or more of the problems set forth above, in an exemplary implementation of the invention, a helicopter with blade-tip thrusters, an annular centrifugal fuel supply tank and a concentric fuselage and cabin is provided. In one embodiment, the helicopter includes a rotor comprised of a plurality of short blades with a thruster at the tip of each blade. The thruster may be an air-breathing, rocket or hybrid thruster. The blades extend from an annular fuel tank. The fuel tank comprises a hub to which the blades are attached, and rotates with the blades. Centrifugal force propels fuel from the interior compartment of the tank through conduits extending through the blades from root to tip, to the thrusters. Valves (e.g., solenoid valves and/or a flyweight governor) may be provided to regulate fuel flow to achieve and maintain a determined steady rotational speed. A fuselage covered by a canopy with a fuselage support flange is mounted atop a bearing assembly on the annular fuel tank. The pitch of each blade may be adjusted collectively and cyclically using a swash ring and linear actuators (e.g., hydraulic servos). Landing gear supports the helicopter above ground and facilitates transportation.

In one exemplary embodiment, a thruster powered helicopter according to principles of the invention includes a fuselage with an outer periphery of circular cross section of a first diameter and a rotating annular fuel tank with an inner periphery of circular cross section of a second diameter and an outer periphery. The second diameter is greater than the first diameter. The rotating annular fuel tank has an interior fuel compartment for containing a fuel. The fuselage and rotating annular fuel tank are concentric. Thrusters are mechanically coupled to the outer periphery of the rotating annular fuel tank. A fuel supply line extends from the interior fuel compartment of the annular fuel tank to each of the plurality of thrusters. The thrusters combust fuel from the interior fuel compartment to produce thrust. The thrust causes the rotating annular fuel tank to rotate relative to the fuselage. Rotation of the rotating annular fuel tank expels fuel from the interior fuel compartment through each fuel supply line to each of the thrusters for combustion and consequent thrust. A swash ring disposed between the fuselage and rotating annular fuel tank has a grooved outer periphery The thruster powered helicopter may include blades coupled to the outer periphery of the rotating annular fuel tank and extending from the outer periphery of the rotating annular fuel tank to each of the plurality of thrusters. Each blade has an airfoil cross-section shape and generates aerodynamic lift when rotated with the rotating annular fuel tank.

Each blade may be pivotally coupled by a crank arm to the rotating annular fuel tank. The crank arm allows pivoting adjustment of the pitch of each blade. The crank arm includes a free end that may be engaged for pivoting adjustment of the pitch of each blade. The free end extends through the inner periphery of the annular fuel tank.

A swash ring is disposed between the fuselage and rotating annular fuel tank. The swash ring has a grooved outer periphery. The grooved outer periphery includes a groove sized to receive the free end of each crank arm. The groove has a center in a swash ring plane. The swash ring is capable of linear motion along a first axis perpendicular to the swash ring plane, pitch motion about a second axis parallel to the swash ring plane and perpendicular to the first axis, roll motion about a third axis parallel to the swash ring plane and perpendicular to the first axis and perpendicular to the second axis, and combinations of linear, pitch and roll motions. Such linear, pitch and roll motions affect the free end of each crank arm engaged in the groove, and thereby cause an attendant change in the pitch of each blade.

A plurality of actuators are coupled to the swash ring. The actuators affect linear, pitch and roll motions of the swash ring. The actuators may comprise hydraulic servos.

A collective control actuates the actuators (e.g., hydraulic servos) to affect linear motion of the swash ring. A cyclic control actuates actuators (e.g., hydraulic servos) to affect pitch and roll motion of the swash ring.

A stabilizer (e.g., anti-torque device) is coupled to the fuselage. The stabilizer controllably generates a force opposing rotation of the fuselage to stabilize orientation of the fuselage. An example of such a stabilizer is a supplemental thruster.

In one embodiment, the fuselage and rotating annular fuel tank comprise lift generating bodies.

In one embodiment, each of the thrusters may be pivotally coupled to the outer periphery of the rotating annular fuel tank. One of the thrusters may pivot from zero degrees to at least 180 degrees. Each of the thrusters may be pivotally coupled by a crank arm to the rotating annular fuel tank. The crank arm allows pivoting adjustment of the pitch of each thruster. The crank arm includes a free end engagable for pivoting adjustment of the pitch of each thruster. In this embodiment, a swash ring may be provided to engage the free end of each crank arm in the groove and control pitch of the thrusters.

BRIEF DESCRIPTION OF THE DRAWINGS

The foregoing and other aspects, objects, features and advantages of the invention will become better understood with reference to the following description, appended claims, and accompanying drawings, where:

Figure 1:
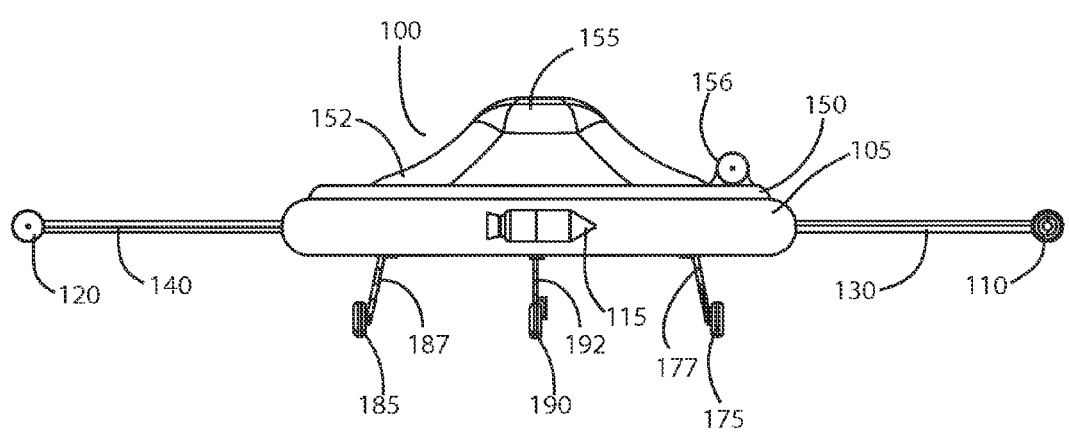
FIG. 1 is a front view of an exemplary helicopter with blade-tip thrusters and an annular centrifugal fuel supply tank and concentric cabin according to principles of the invention.
Figure 2:
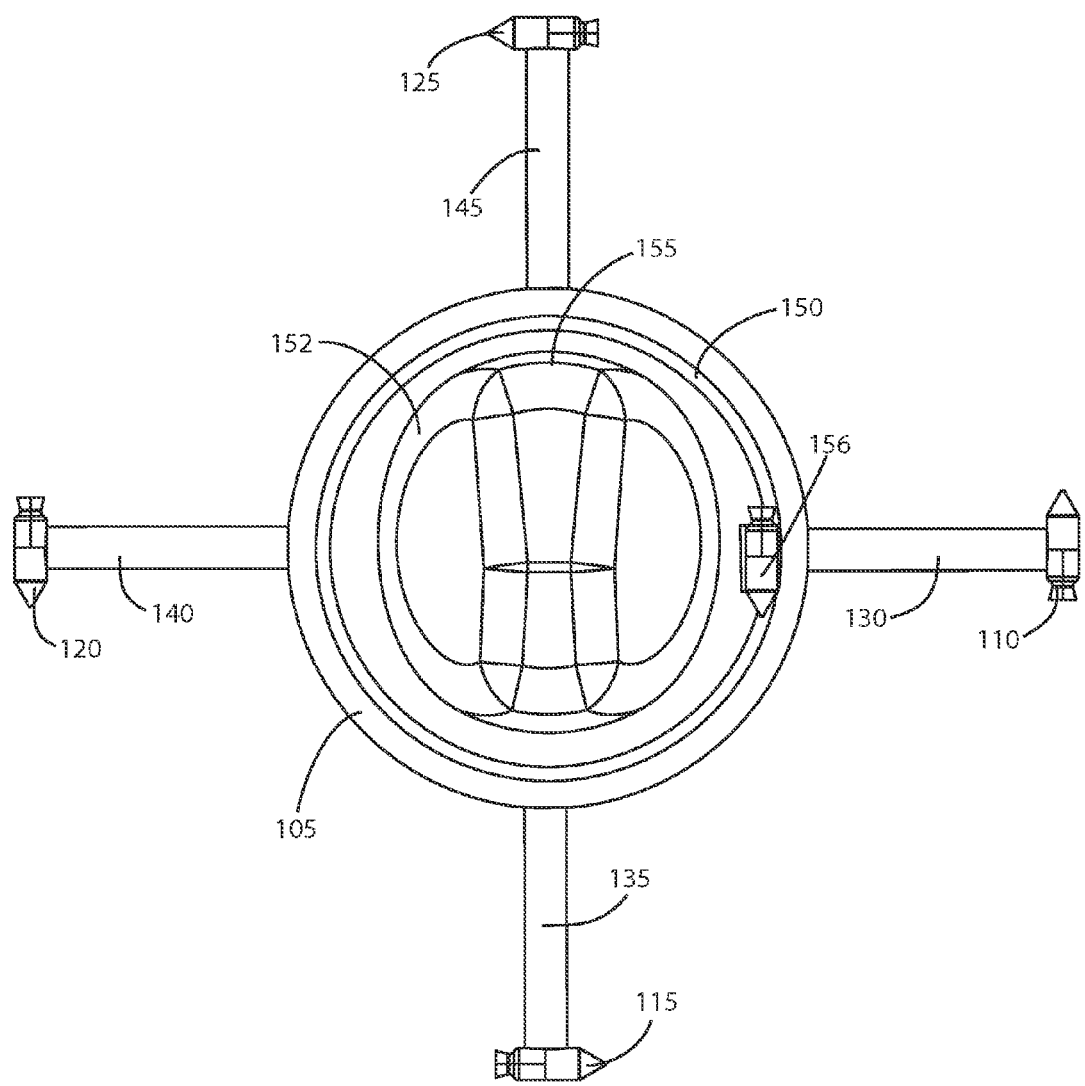
FIG. 2 is a plan view of an exemplary helicopter with blade-tip thrusters and an annular centrifugal fuel supply tank and concentric cabin according to principles of the invention.
Figure 3:
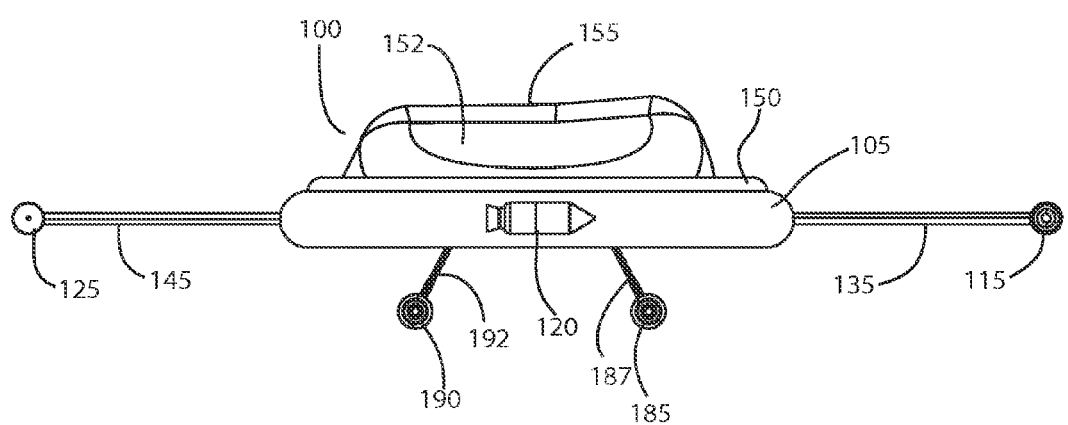
FIG. 3 is a side view of an exemplary helicopter with blade-tip thrusters and an annular centrifugal fuel supply tank and concentric cabin according to principles of the invention.
Figure 4:
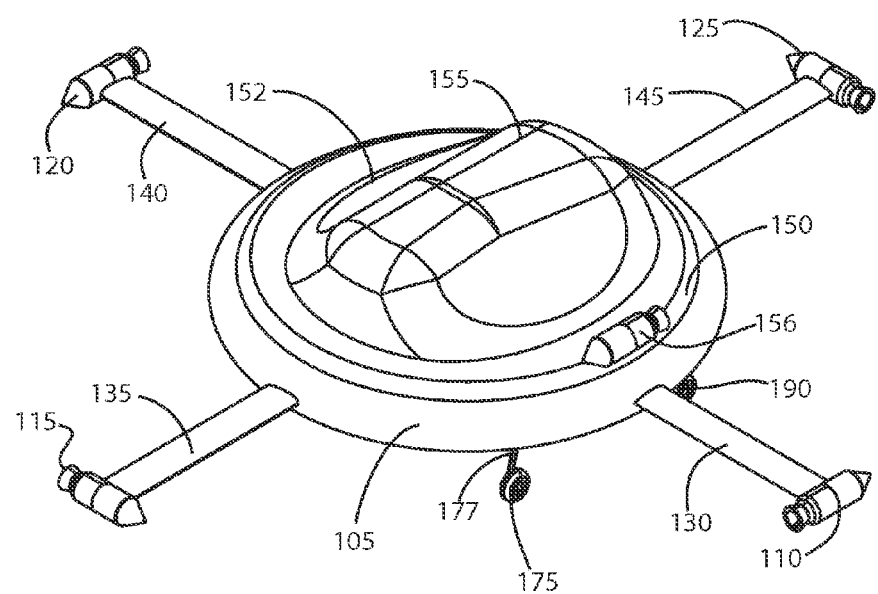
FIG. 4 is a perspective view of an exemplary helicopter with blade-tip thrusters and an annular centrifugal fuel supply tank and concentric cabin according to principles of the invention.

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Referring to FIGS. 1 to 4 an exemplary helicopter 100 includes a rotor comprised of a plurality of short blades 130, 135, 140, 145 with a thruster 110, 115, 120, 125 at the tip of each blade 130, 135, 140, 145. The thruster 110, 115, 120, 125 may be an air-breathing, rocket or hybrid thruster. The blades 130, 135, 140, 145 extend from annular fuel tank 105. The fuel tank 105 comprises a hub to which the blades 130, 135, 140, 145 are attached, and rotates with the blades 130, 135, 140, 145. Centrifugal force propels fuel from an interior compartment of the tank 105, through conduits extending through the blades 130, 135, 140, 145 from root to tip, to the thrusters 110, 115, 120, 125. Valves (e.g., solenoid valves and/or a flyweight governor) may be provided to regulate fuel flow to achieve and maintain a determined steady (or approximately steady) rotational speed during flight. The valves may be part of valve assemblies that include manifolds to redirect some fuel to one or more auxiliary devices, such as, by way of example, supplemental thruster 156. A fuselage covered by a canopy 155 with a fuselage support flange 150 is mounted atop a bearing assembly 440 (FIG. 18) on the annular fuel tank. The pitch of each blade 130, 135, 140, 145 may be adjusted collectively and cyclically using a swash ring and hydraulic linear actuators. Landing gear 175, 177, 185, 187, 190, 192 supports the helicopter 100 above ground and facilitates transportation.

The fuselage 152, a body section that holds crew in a cockpit and passengers or cargo in a connected compartment, is covered by a canopy 155. The canopy 155, a substantially transparent enclosure over the cockpit, shields the crew from ambient conditions, including wind, the elements and noise. The canopy 155 may be any aerodynamic shape that is suitable for providing a protective cover. By way of example and not limitation, the canopy may be vacuum formed acrylic.

Figure 5:
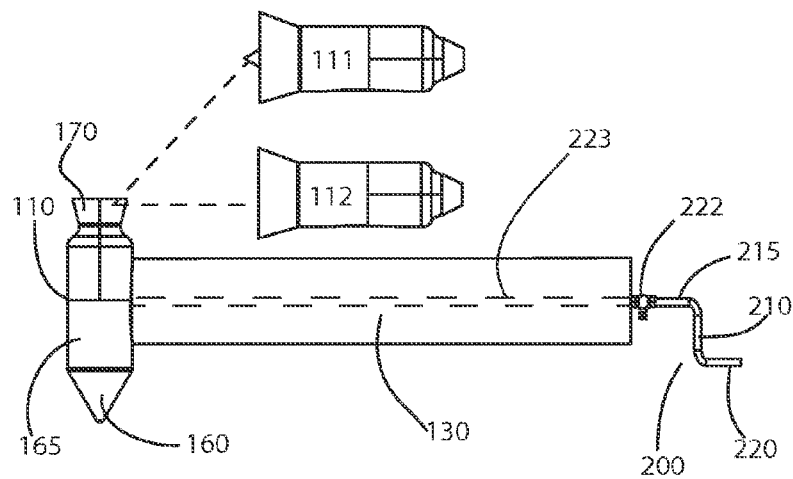
FIG. 5 is a plan view of an exemplary blade assembly for a helicopter with blade-tip thrusters and an annular centrifugal fuel supply tank and concentric cabin according to principles of the invention.
Figure 6:
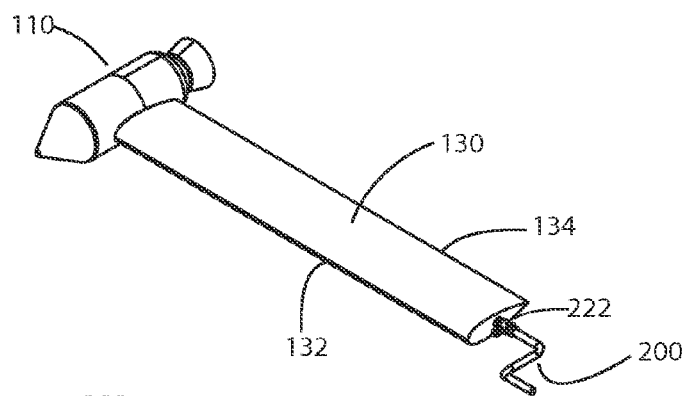
FIG. 6 is a root perspective view of an exemplary blade assembly for a helicopter with blade-tip thrusters and an annular centrifugal fuel supply tank and concentric cabin according to principles of the invention.
Figure 7:
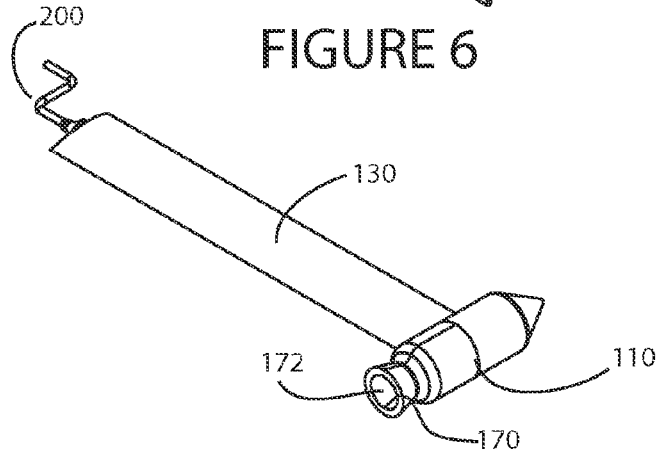
FIG. 7 is a tip perspective view of an exemplary blade assembly for a helicopter with blade-tip thrusters and an annular centrifugal fuel supply tank and concentric cabin according to principles of the invention.

In the exemplary embodiment, an engine (i.e., thruster) 110, 115, 120, 125 attached at the tip of each blade 130, 135, 140, 145 produces thrust. In other embodiments, two of the blades have thrusters, while additional blades do not have thrusters. In one embodiment, the thrust vector produced by each thruster 110, 115, 120, 125 is normal to the longitudinal axis of the corresponding blade 130, 135, 140, 145. The blades 130, 135, 140, 145 rotated by the thrusters 110-125 produce lift for flight. Advantageously, this configuration renders a conventional transmission unnecessary. The thruster may be an air-breathing engine or rocket engine. In the case of an air-breathing engine, such as a jet (111 in FIG. 5), turbojet, ramjet (112 in FIG. 5) or pulsejet, an appropriate jet fuel may be used. Nonlimiting examples of such jet fuel include JetA, JetA1, JetB, or any of the military jet propellants, such as JP-1 to JP-8. In the case of a rocket engine, a storable propellant is used. If a monopropellant rocket fuel, such as hydrogen peroxide, hydrazine, or nitrous oxide, is used, then the entire fuel storage compartment 400 (FIG. 15) of the annular fuel tank 105 may be filled with the monopropellant. If a separate liquid fuel and oxidizer are used, such as nitrogen tetroxide oxidizer with hydrazine, or with monomethylhydrazine, or with unsymmetrical dimethylhydrazine, then the annular fuel tank 105 may be divided into separate compartments, e.g., separate top and bottom sections, 402, 403, to store the liquid oxidizer separate from the liquid fuel, as conceptually illustrated in the section view of FIG. 15. In such case, the compartments may be proportionately sized to achieve a desired oxidizer to fuel ratio, such as but not limited to stoichiometric. If a thruster requires a starter (e.g., as in the case of a ramjet) then a supplemental starting thruster or a motor may be provided to achieve a rotational speed and intake pressure sufficient to start the engine.

The rocket engine includes an aerodynamic nose cone 160, a body 165 containing a combustion chamber, and a nozzle 170. If the propellant is a hypergolic mixture of fuel and oxidizer, then an igniter may be unnecessary. In the case of a jet engine, a compressor, combustion chamber, turbine and nozzle are provided.

In an embodiment with lift generating blades, the helicopter includes at least two rotor blades. In the exemplary embodiment, four blades 130, 135, 140, 145 are shown. The rotating blades generate both the aerodynamic lift force that supports the weight of the helicopter and a thrust vector which exceeds aerodynamic drag in directional flight. The blades 130, 135, 140, 145 are airfoils with a high aspect ratio, a shape which minimizes drag from tip vortices. Unlike conventional helicopter rotor blades which generally contain a degree of washout at the tip to reduce vortex generation, the rotor blades of the present invention generate lift throughout their length. The tip thrusters 110, 115, 120, 125 help reduce tip vortices. The rotor blades 130, 135, 140, 145 may be made out of various materials, including aluminum, steel or titanium, or composites, with or without abrasion shields along the leading edge. Any suitable airfoil shape may be used, though a subsonic, generally symmetric airfoil is shown. Additionally, the airfoil shape may vary from root to tip or remain uniform as shown in the Figures.

The rotor blades 130, 135, 140, 145 are attached to the rotating annular fuel tank 105. The attachment allows pivoting of the blades 130, 135, 140, 145 to change pitch of the blades relative to the annual fuel tank. The pitch of each blade 130, 135, 140, 145 may be adjusted collectively and cyclically using a swash ring and hydraulic linear actuators that interact with a pitch change link 200 in FIGS. 5-9 and 225, 230, 235, 240 in FIGS. 10 and 11. By changing pitch, lift and the net thrust vector are varied. Thrust vectoring is an ability of the aircraft to manipulate the direction of the net thrust from its thrusters and blades in order to control attitude, velocity and acceleration.

Figure 8:
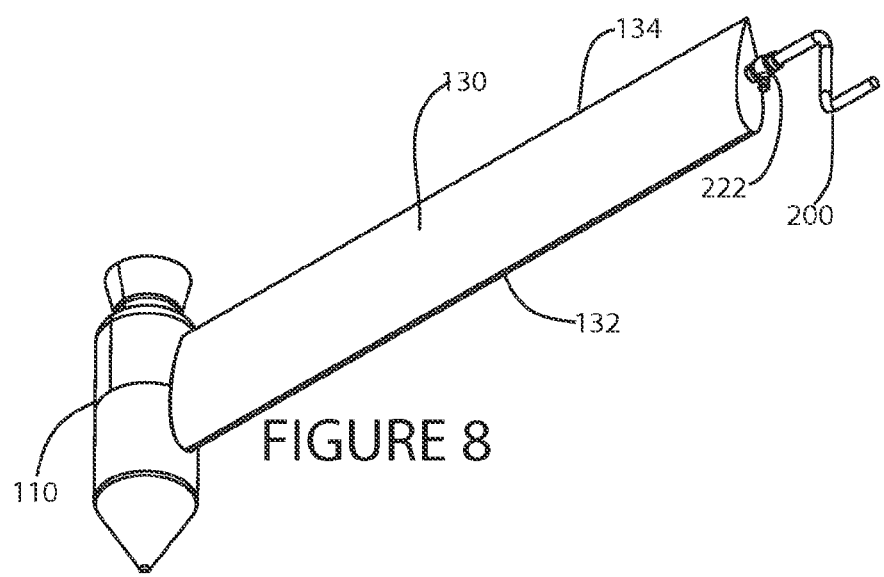
FIG. 8 is another root perspective view of an exemplary blade assembly for a helicopter with blade-tip thrusters and an annular centrifugal fuel supply tank and concentric cabin according to principles of the invention.
Figure 9:
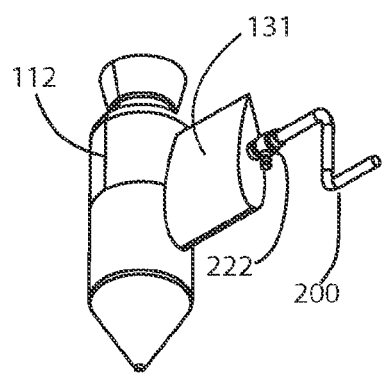
FIG. 9 is a root perspective view of an exemplary thruster mounted on an airfoil with a short wingspan for a helicopter with blade-tip thrusters and an annular centrifugal fuel supply tank and concentric cabin according to principles of the invention.

Referring to FIGS. 8 and 9, in a preferred embodiment, the thruster 100 is attached to the tip of each blade 130. However, in other embodiments, the thruster 111 may be attached between the root and tip of each blade, including near the root, such as thruster 112 in FIG. 9.

At least one conduit extends through each rotor blade 130, 135, 140, 145 from root to tip. Each conduit may be comprised of a hose, tube, pipe or liquid-tight channel. The conduits supply oxidizer and/or fuel from the annular fuel tank 105 to the thrusters 110, 115, 120, 125.

Figure 10:
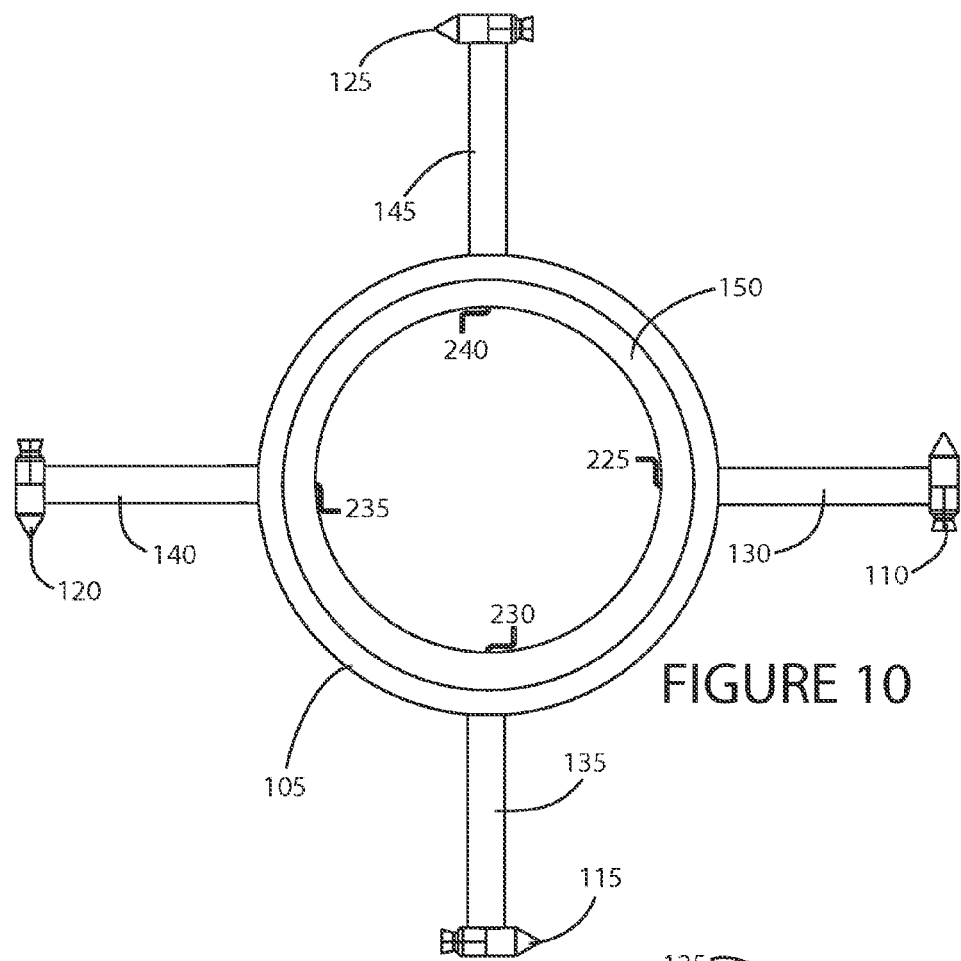
FIG. 10 is a plan view of an exemplary annular centrifugal fuel supply tank and blade assembly for a helicopter according to principles of the invention.
Figure 11:
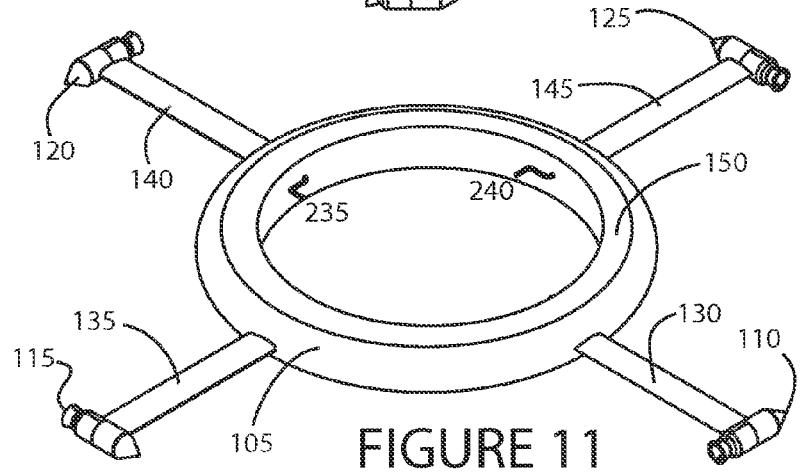
FIG. 11 is a perspective view of an exemplary annular centrifugal fuel supply tank and blade assembly for a helicopter according to principles of the invention.
Figure 15:
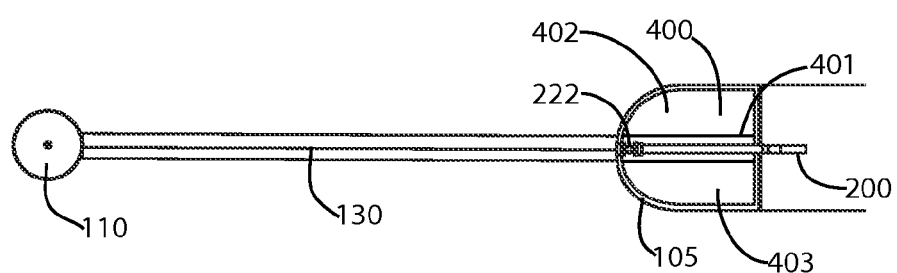
FIG. 15 is a section view of a portion of an annular centrifugal fuel supply tank and a blade assembly for a helicopter according to principles of the invention.
Figure 16:
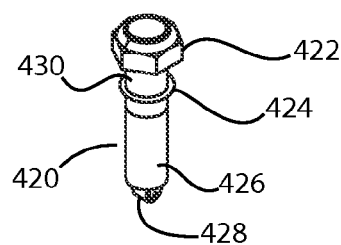
FIG. 16 is a perspective view of a roller bearing cartridge for a helicopter according to principles of the invention.
Figure 17:
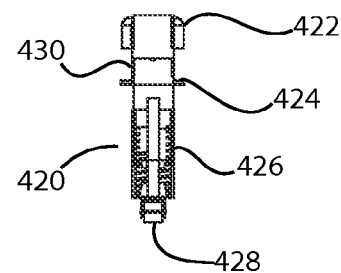
FIG. 17 is a section view of a roller bearing cartridge for a helicopter according to principles of the invention.

A crank arm, known as a pitch change link, extends from the root of each blade, as shown in FIGS. 5 through 11 and FIG. 15. The free end 220 of the pitch change link 200 mates with and slides in a groove in a swash ring on the fuselage 152 (inboard) side of the annular fuel tank. The arm 210 imparts torque from the free end 220 to the shaft 215. Optionally, the free end 220 may include a low friction coating and/or roller bearing to facilitate sliding motion through the swash ring groove. The shaft 215 connects to the blade at the point about which the blade pivots for pitching motion. This point is typically the center of lift along the chord of the airfoil. For many airfoils, this is at about the quarter chord. The shaft 215 is long enough to extend through a section of the annular fuel tank 105, as illustrated in FIGS. 10 and 11. Bearings and seals may be provided to prevent to facilitate rotation of the shaft 215 relative to the fuel tank 105 and to prevent leakage. As illustrated in FIG. 15, a conduit 401 may be provided in the fuel tank 105, extending from the outboard opening to the inboard opening, through which the shaft 215 extends. Such a conduit 401 may isolate the shaft 215 from the fuel contained in the fuel tank.

Each blade includes at least one fuel inlet. In implementations where the fuel and an oxidizer are maintained separate until combustion, each blade may include a pair of inlets. For monopropellants, a single inlet per blade may suffice. The inlet is in fluid communication with each conduit. The inlet provides a fluid coupling between the conduit and annular fuel tank 105. A flexible hose may extend from the fuel tank 105 to the inlet. In the exemplary embodiment, the inlet is comprised of a banjo fitting 222.

Figure 12:
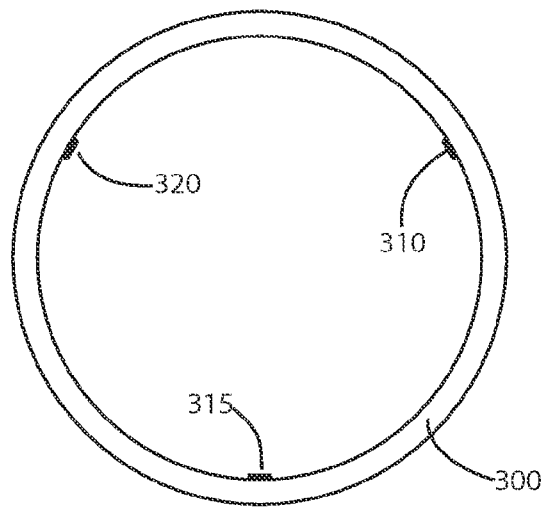
FIG. 12 is a plan view of an exemplary swash ring for a helicopter according to principles of the invention.
Figure 13:
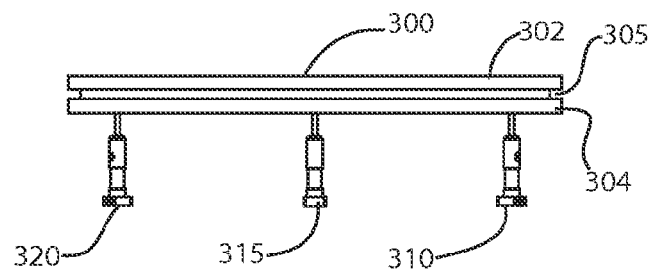
FIG. 13 is a side view of an exemplary swash ring for a helicopter according to principles of the invention.
Figure 14:
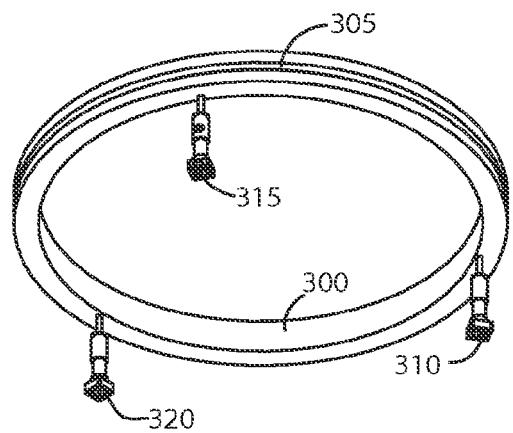
FIG. 14 is a perspective view of an exemplary swash ring for a helicopter according to principles of the invention.

Referring to FIGS. 12 through 14, a swash ring 300 and plurality of linear actuators 310, 315, 320 provide collective and cyclical pitch control. The swash ring 300 does not rotate. One end of each linear actuator is attached to the fuselage 152. The opposite end is attached to the bottom side of the swash ring. The attachment is preferably a swivel or ball-joint style connection that allows pivoting of the swash ring relative to the connected end of the actuator. A peripheral groove 305 is provided between the top 302 and bottom 304 sections of the swash ring 300. The free end 220 of each pitch change link 200 travels in the grove 305.

The actuators control the height and orientation of the swash ring relative to a neutral height and horizontally level orientation. The three actuators 310, 315, 320 are spaced radially equidistant (120° apart) along the bottom side of the swash ring. Extending an actuator raises the corresponding section of the swash ring. Extending all actuators raises all sections of the swash ring. However, the invention is not limited to such an arrangement of actuators. Rather other types, numbers and arrangements of actuators may be used without departing from the scope of the invention.

The swash ring 300 is located between the fuselage 152 and annular fuel tank 105. The swash ring 300 has a range of motion (designated $h_p$ for pitch height) from a neutral position that does not exceed the length of the arm 210 of the pitch change link 200. The swash ring 300 may be moved up or down from the neutral position. This range of motion defines the maximum pitch of the blades. The maximum pitch should be set less than the stall angle of attack of the blades at normal operating speed. The swash ring 300 is capable of linear motion along a first axis perpendicular to the swash ring plane, pitch motion about a second axis parallel to the swash ring plane and perpendicular to the first axis, roll motion about a third axis parallel to the swash ring plane and perpendicular to the first axis and perpendicular to the second axis, and combinations of such linear, pitch and roll motions. Such linear, pitch and roll motions affect the free end of each crank arm engaged in the groove, and thereby cause an attendant change in the pitch of each blade. Thus, as the linear actuators 310, 315, 320 raise one section of the swash ring 300, the pitch of each blade as its pitch change link 200 travels through that section of the swash ring 300 will correspondingly increase. If the linear actuators 310, 315, 320 equally raise all sections of the swash ring 300 from the neutral position, the pitch of each blade will correspondingly equally increase.

The fuselage 152 with a fuselage 152 support flange 150 is mounted atop a bearing assembly on the annular fuel tank 105. An exemplary bearing cartridge 420 and bearing ring assembly 440 are illustrated in FIGS. 16 through 20. The bearing assembly 440, which includes a plurality of (e.g., 12 equally spaced apart, 30° apart) cartridges 420, allows rotation of the annular fuel tank 105 relative to the fuselage 152. The bearing assembly 440 does not rotate relative to the fuselage 152. The exemplary cartridge 420 includes a neck 430 that extends through the top surface of the ring 424, a shoulder 424 that abuts the underside of the top surface of the ring 424, and a lock nut 422 that secures the cartridge 420 to the ring 424. A sleeve 426 houses a compression spring and moving shaft to which the roller 428 is attached. Thus, the cartridge maintains the roller 428 against a surface, such as base 444, with a force determined by the spring constant and compression of the spring. Base 444 may be coupled to the annular fuel tank 105 while ring 440 may be mounted on the underside or periphery of the support flange 150 of the fuselage 152. Thus, the base 444 rotates with the annular fuel tank 105. The rollers 428 of the bearings 420 contact the bottom support 444 during rotation of the base 444 to reduce friction and thereby facilitate rotation.

In lieu of or in addition to the roller bearings, a fluid bearing and/or magnetic bearing may be provided to reduce friction and facilitate rotation. A fluid bearing uses a thin layer of fluid (e.g., compressed air) between the bearing faces. The fluid may flow in through an orifice or through a porous material. Even if air constantly leaks from a bearing gap, the pressure of introduced compressed air between the faces of the bearing may be enough to support the working loads. A magnetic bearing may support the load using magnetic levitation induced using permanent magnets or electromagnets which require continuous power input and an active control system to hold the load stable. In a combined design, permanent magnets may be used to carry a static load and an electromagnet may be used when the levitated face deviates from its optimum position. Roller bearings may be provided as a back-up in the case of power or control system failure for electromagnetic levitation bearings.

A gyroscope and motor may be provided to prevent any unintended rotation of the fuselage 152 relative to the fuel tank 105. By way of example, and not limitation, a supplemental thruster 156 is attached to the support flange 150 to maintain the fuselage 152 in a desired orientation relative to the rotating annular fuel tank 105. By varying thrust of the supplemental thruster 156, a pilot may maintain directional control.

Figure 18:
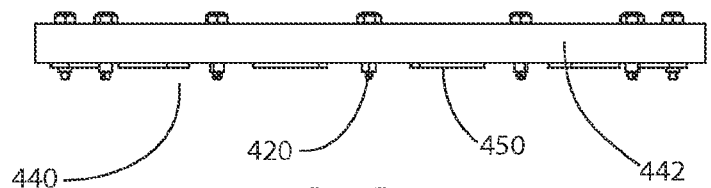
FIG. 18 is a side view of a roller bearing ring assembly for a helicopter according to principles of the invention.
Figure 19:
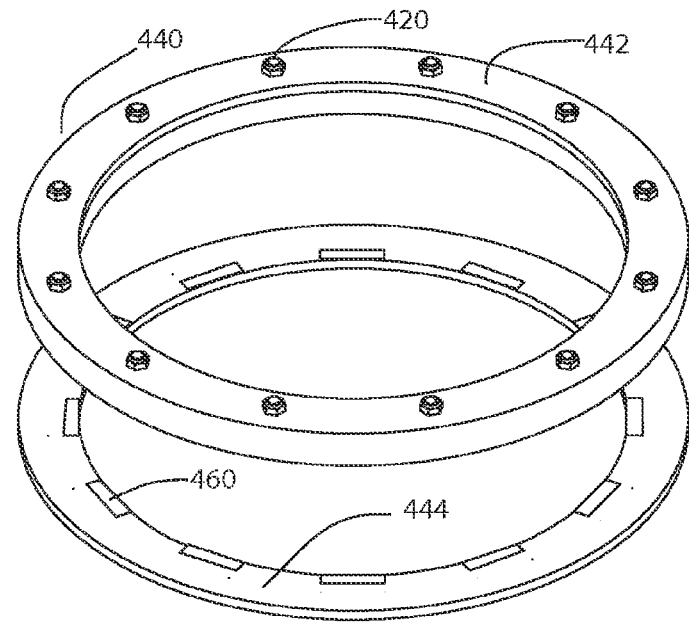
FIG. 19 is a top perspective view of a roller bearing ring assembly and base plate for a helicopter according to principles of the invention.
Figure 20:
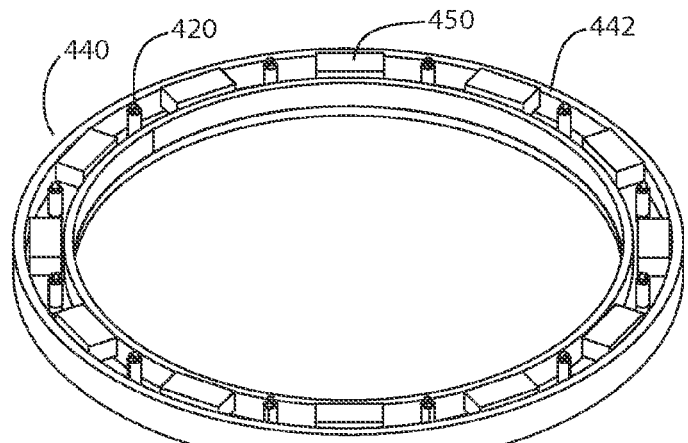
FIG. 20 is a bottom perspective view of a roller bearing ring assembly for a helicopter according to principles of the invention.

An electric generator may be provided to supply electric power to instrumentation and controls and to maintain batteries in a charged state. By way of example and not limitation, the generator may be a magneto, motor or alternator driven by a rotating structure such as base 444. Illustratively, as shown in FIGS. 18, 19 and 20, a magneto comprised of strong permanent magnets 460 embedded in the rotating base 444 outside the path of the roller bearings, and a plurality of armatures 450 in the bearing ring assembly may be provided. The armatures include primary and secondary coils. They are controlled by an electronic control unit. When the magnets rotate on the base 444 past the armatures, they induce a magnetic field in the armatures. This field induces current in primary and secondary coils of the armature. The secondary coil, having many (e.g., 100 times) more turns than the primary coil, amplifies the voltage in the primary coil to produce a useful electric output.

Referring again to FIGS. 1 through 4, the landing gear 175, 177, 185, 187, 190, 192 supports the aircraft on the ground. While wheeled landing gear are shown, skids, skis, floats or a combination of these and other elements can be utilized, depending on the mission. The wheels may be equipped with a shock absorber suspension for dampening shocks and vibrations. As conceptually illustrated the landing gear 175, 177, 185, 187, 190, 192 incorporates oleo-pneumatic struts, telescopic sections containing oil and a compressed gas acting as a spring and damper. Three or more wheels may be used. To decrease drag in flight the landing gear may fully or partially retract into the undercarriage of the fuselage 152 during flight.

Figure 21:
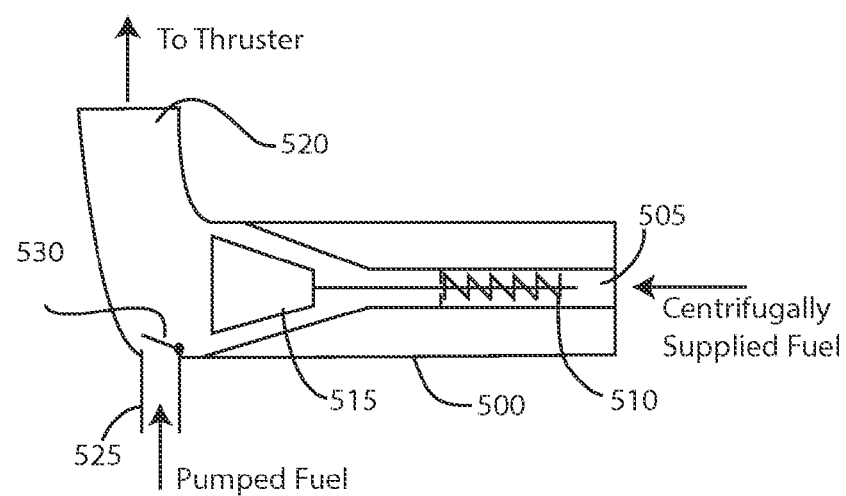
FIG. 21 is a high level schematic illustrating exemplary components of a fuel supply governor and valve for a helicopter according to principles of the invention.

Various valves and governors may be used to control fuel flow to the thrusters. The valves may include solenoid valves and/or centrifugal valves. A pump may be provided to initiate fuel flow for starting. Pumped fuel may be delivered through a starting inlet 525 and a check valve (e.g., one way valve 530) to a conduit 520 in fluid communication with a thruster, as conceptually illustrated in FIG. 21. After starting, centrifugal force may propel fuel from the tank 105 to the thrusters. A centrifugal flyweight governor 500 uses the centrifugal force of a weight 515 and an opposite tension or compression of a spring 510 to regulate fuel flow from an inlet 505. The centrifugal force varies with the rotational speed of the annular fuel tank 105. The tension or compression of the spring 510 opposes the centrifugal force. When the two opposing forces are equal, or balanced, the rotational speed remains constant.

In one embodiment, a mechanical control linkage system may be assisted by hydraulics and have a force trim system to provide an artificial feel of resistance in the system. The mechanical control linkage mechanically couples flight controls (e.g., joystick, lever and pedals) to the swash ring 300. The hydraulic system provides assisting force and also helps dampen feedback from the control surfaces.

An exemplary hydraulic system includes actuators, also called servos, on each flight control, a driven pump, and a reservoir to store the hydraulic fluid. One or more accumulators may store hydraulic pressure for emergency use in the event of a pump failure. When a control input is made in the cockpit using a lever, joystick or pedal, one or more servos are actuated and forcibly move the respective portions of the swash ring. Such movement of the swash ring adjusts the pitch of the rotor blades, either collectively or cyclically.

Figure 22:
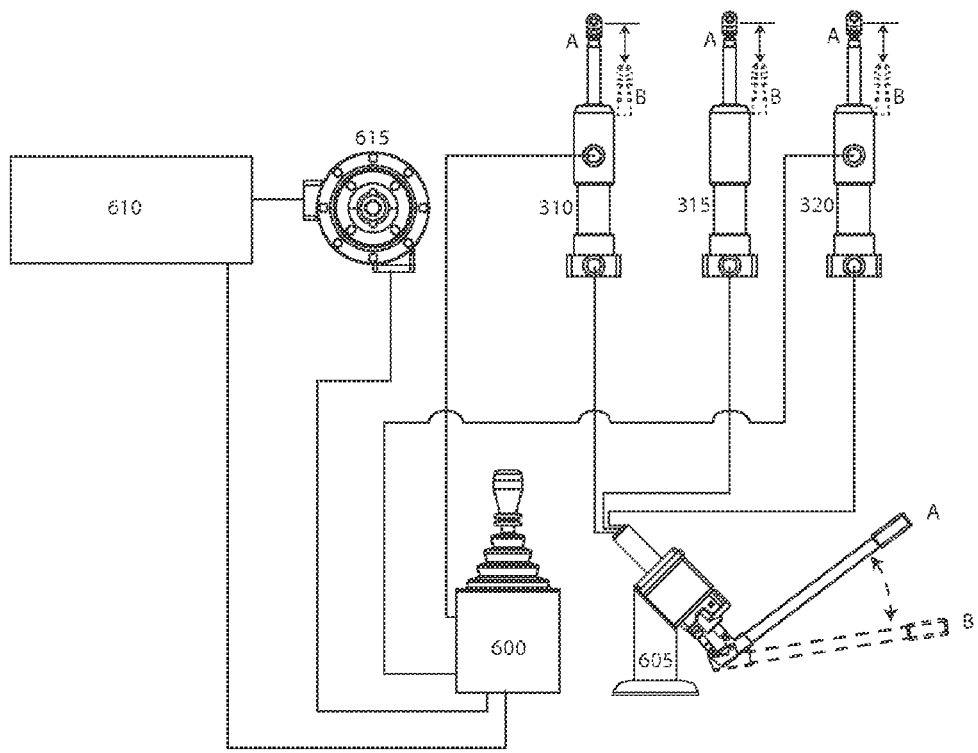
FIG. 22 is a high level schematic illustrating exemplary components of a hydraulic collective and cyclic control system for a helicopter according to principles of the invention.
Figure 23:
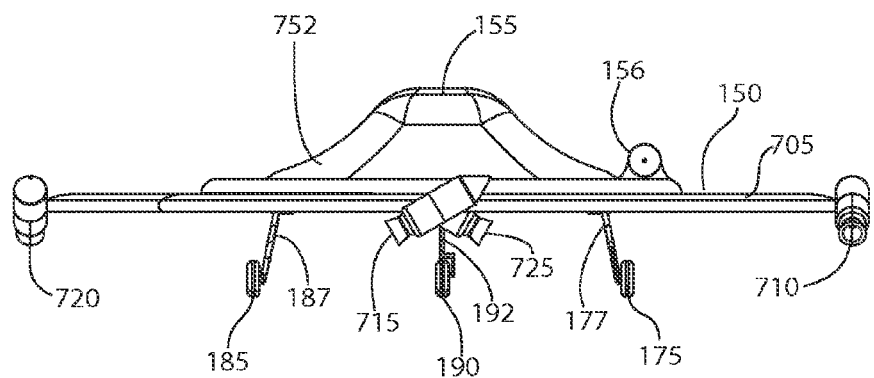
FIG. 23 is a front view of an exemplary helicopter with pivoting thrusters and an annular centrifugal fuel supply tank and concentric cabin, without airfoils, according to principles of the invention.
Figure 24:
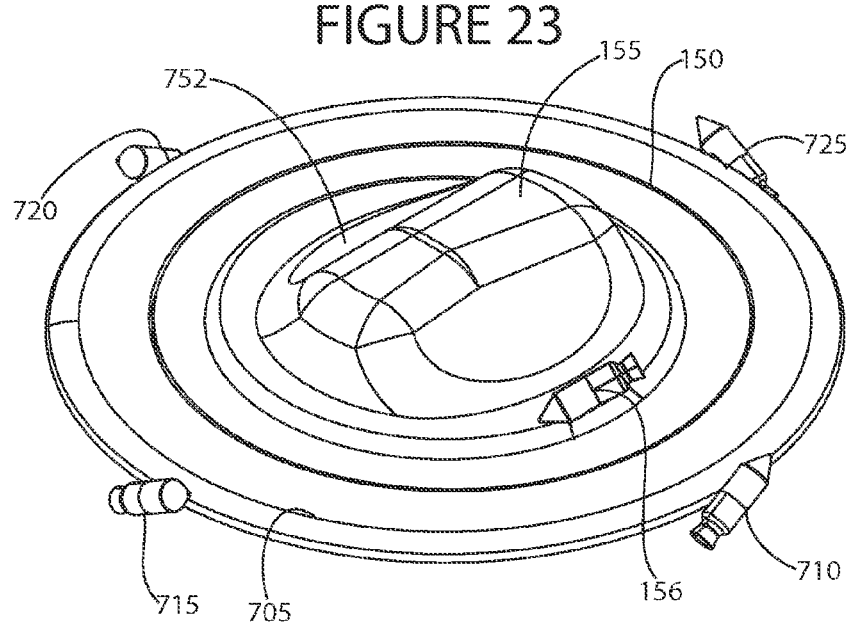
FIG. 24 is a perspective view of an exemplary helicopter with pivoting thrusters and an annular centrifugal fuel supply tank and concentric cabin, without airfoils, according to principles of the invention.

Referring now to FIG. 22, exemplary hydraulics for cyclic and collective control include a hydraulic pump 615, a reservoir 610, the plurality of linear actuators 315, 320, 325 and a plurality of user controls, such as a cyclic joystick 600 and collective lever 605, and/or foot pedals. The reservoir 610 provides a supply of hydraulic fluid for cyclic control. The pump 615 provides a supply of pressurized fluid. The pump may be driven by a belt, gear or drive train operably coupled to the annular fuel tank, or by a separate motor powered by a battery or fuel from the annular fuel tank. The controls 600, 605 are hydraulically coupled to the actuators 315, 320, 325 and the pump 615 and reservoir 610. The collective lever 605 actuates a hydraulic cylinder that provides pressurized hydraulic fluid to the servos 310, 315, 320 equally, and independent of the cyclic control. Various hydraulic circuits are feasible, and the invention is not limited to any particular hydraulic circuit. The lever 605 collectively actuates the actuators 315, 320, 325. The joy stick selectively actuates one or more actuators 315, 320, 325 to provide cyclical thrust control.

As lift is proportional to the square of the speed, it is in principle possible to control lift by changing rotor speed. However, the inertia of the rotor inhibits rapid speed changes. Thus, a constant rotor speed is preferred. Rather than change rotor speed to vary lift, the angle of attack of the rotor blades is varied. In principle, a pilot may holds in one hand the collective pitch lever 605. By lifting the lever, the pitch angle of all of the rotor blades is increased by the same amount, and the rotor lift increases immediately.

The collective pitch control 605, or collective lever 605, is normally located on the left side of the pilot's seat with an adjustable friction control to prevent inadvertent movement. The collective changes the pitch angle of all the rotor blades 130, 135, 140, 145 collectively (i.e., all at the same time) and independent of their position. Therefore, if a collective input is made, all the blades 130, 135, 140, 145 change equally, and the result is the helicopter increases or decreases its total lift derived from the rotating blades 130, 135, 140, 145. In level flight this would cause a climb or descent, while with the helicopter pitched forward an increase in total lift may produce an acceleration together with a given amount of ascent.

In order to move around, the pilot pushes the cyclic joystick 600 in the direction of desired travel. This superimposes a cyclic variation of blade pitch on the average or collective setting by tilting the swash ring. The cyclic control 600 changes the pitch angle of the rotor blades cyclically. That is, the pitch or feathering angle of the rotor blades 130, 135, 140, 145 changes depending upon their position as they rotate around the fuselage 152 so that all blades will have the same pitch at the same point in the cycle. The change in cyclic pitch has the effect of changing the angle of attack of a blade 130, 135, 140, 145 and thus the lift generated by a single blade as it moves around the fuselage 152. The result is that lift will increase on one side of the rotor and decrease on the other. In effect, the application of cyclic control 600 tilts the thrust vector. As a result the helicopter will accelerate in the desired direction.

Advantageously, the rotating annular fuel tank provides increased stability. Gyroscopic forces resulting from the rotating fuel tank naturally resist any unintended change in orientation.

Optionally, a cargo parachute may be provided in the center of the canopy to safely lower the entire aircraft in the event of a major problem. In another optional embodiment, the fuselage 152 may be controllably separable from the annular fuel tank. In yet another optional embodiment, ejection seats with parachutes and a blow away canopy may be provided.

In the embodiments of FIGS. 23 through 26, blades are eliminated. The swash ring 300 controls pitch of the thrusters 710, 715, 720, 725, in the same manner that the swash ring 300 controls pitch of the blades 130, 135, 140, 145 in the embodiments described above. Thus the pitch link crank arm is coupled to the thrusters 710, 715, 720, 725 and maneuvered by the swash ring 300. In this embodiment, the thrust vector is oriented to generate a sufficient lifting force for flight while producing net thrust for motion in a desired direction.

Figure 25:
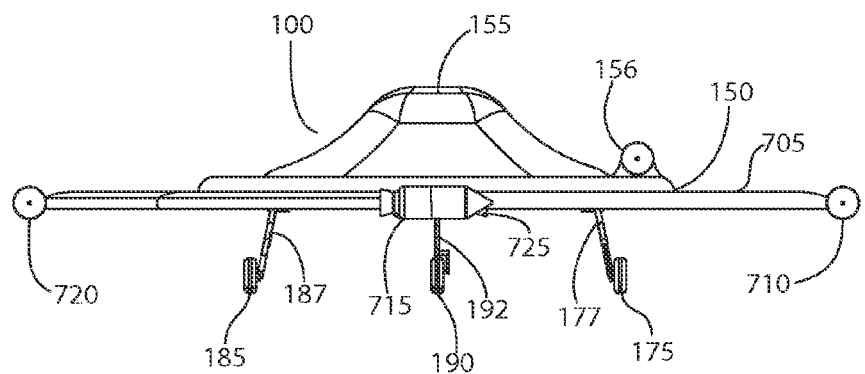
FIG. 25 is a front view of an exemplary helicopter with a lifting body, pivoting thrusters, including a pair of forwardly oriented thrusters, and an annular centrifugal fuel supply tank and concentric cabin, without airfoils, according to principles of the invention.
Figure 26:
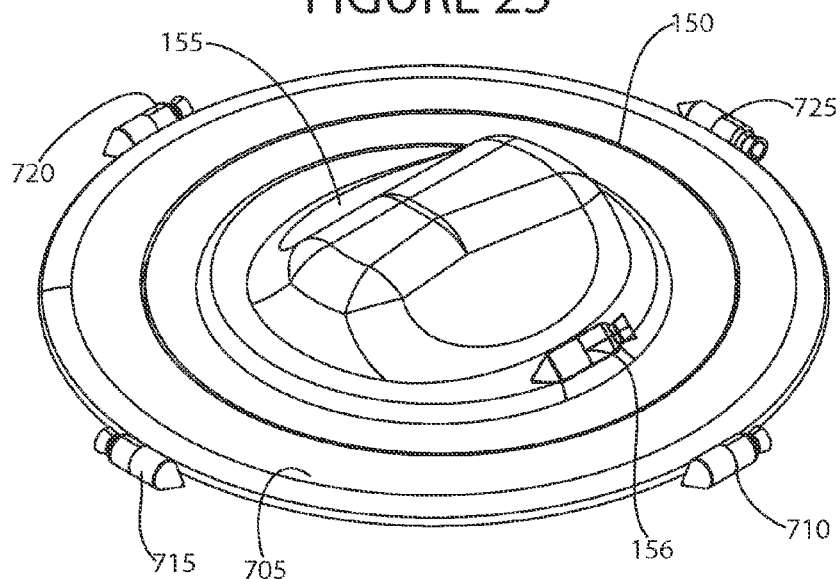
FIG. 26 is a perspective view of an exemplary helicopter with a lifting body, pivoting thrusters, including a pair of forwardly oriented thrusters, and an annular centrifugal fuel supply tank and concentric cabin, without airfoils, according to principles of the invention.

In the embodiment illustrated in FIGS. 25 and 26, at least one thruster 710 is rotatable at least 180° and the fuselage 752 and annular fuel tank 705 comprise lift generating bodies that produce lift during motion. As lifting bodies, the bodies (e.g., the structures comprised of the fuselage 752 and annular fuel tank 705) produce lift in the manner of a flying wing. This embodiment improves cruise efficiency by reducing non-lifting surfaces. In this embodiment, thrusters 710, 715, 720, 725 control pitch, yaw and roll of the aircraft.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A thruster powered helicopter comprising
    a fuselage having an outer periphery of circular cross section of a first diameter, and
    a rotating annular fuel tank having an inner periphery of circular cross section of a second diameter and an outer periphery, said second diameter being greater than the first diameter, said rotating annular fuel tank having an interior fuel compartment for containing a fuel, and said fuselage and rotating annular fuel tank being concentric, and
    a swash ring disposed between the fuselage and rotating annular fuel tank, said swash ring having a grooved outer periphery, and
    a plurality of thrusters mechanically coupled to the outer periphery of the rotating annular fuel tank, a fuel supply line extending from the interior fuel compartment of the annular fuel tank to each of the plurality of thrusters, and each of said plurality of thrusters combusting fuel from said interior fuel compartment to produce thrust, and said thrust causing said rotating annular fuel tank to rotate relative to the fuselage, and rotation of said rotating annular fuel tank expelling fuel from said interior fuel compartment through each fuel supply line to each of said plurality of thrusters for combustion and consequent thrust;

a blade for each of the plurality of thrusters, the blade being coupled to the outer periphery of the rotating annular fuel tank and extending from the outer periphery of the rotating annular fuel tank to one of the plurality of thrusters, each blade mechanically coupling the outer periphery of the rotating annular fuel tank to one of the plurality of thrusters, each blade having an airfoil cross-section shape and generating aerodynamic lift when rotated with said rotating annular fuel tank; and each blade mounted to a crank arm and being pivotally coupled by the crank arm to the rotating annular fuel tank, said crank arm allowing pivoting adjustment of the pitch of each blade, said crank arm including a free engageable for pivoting adjustment of the pitch of each blade.

2. The thruster powered helicopter according to claim 1, said grooved outer periphery of the swash ring including a groove sized to receive the free end of each crank arm, the groove having a center in a swash ring plane, the swash ring being:

capable of linear motion along a first axis perpendicular to the swash ring plane, capable of pitch motion about a second axis parallel to the swash ring plane and perpendicular to the first axis, and capable of roll motion about a third axis parallel to the swash ring plane and perpendicular to the first axis and perpendicular to the second axis, and further capable of combinations of any of said linear, pitch and roll motions, and such linear, pitch and roll motions affecting the free end of each crank arm engaged in the groove, and thereby causing an attendant change in the pitch of each blade.

3. The thruster powered helicopter according to claim 2, further comprising a plurality of actuators coupled to said swash ring said plurality of actuators affecting linear, pitch and roll motions of the swash ring.

4. The thruster powered helicopter according to claim 3, said plurality of actuators comprising a plurality of hydraulic servos.

5. The thruster powered helicopter according to claim 4, further comprising a collective control, said collective control actuating said hydraulic servos to affect linear motion of the swash ring.

6. The thruster powered helicopter according to claim 5, further comprising a cyclic control, said cyclic control actuating said hydraulic servos to affect pitch and roll motion of the swash ring.

7. The thruster powered helicopter according to claim 3, further comprising a collective control, said collective control affecting linear motion of the swash ring.

8. The thruster powered helicopter according to claim 7, further comprising a cyclic control, said cyclic control affecting pitch and roll motion of the swash ring.

9. The thruster powered helicopter according to claim 1, further comprising a stabilizer coupled to said fuselage, said stabilizer controllably generating a force opposing rotation of the fuselage to stabilize orientation of the fuselage.

10. The thruster powered helicopter according to claim 9, said stabilizer comprising a supplemental thruster.

11. The thruster powered helicopter according to claim 1, said fuselage and rotating annular fuel tank comprising lift generating bodies.

12. The thruster powered helicopter according to claim 1, each of said plurality of thrusters being pivotally coupled to the blade that mechanically couples the outer periphery of the rotating annular fuel tank to the thruster.

13. The thruster powered helicopter according to claim 12, at least one of said plurality of thrusters being pivotally coupled with a range of pivoting motion from zero degrees to at least 180 degrees.

14. The thruster powered helicopter according to claim 12, each of said plurality of thrusters being pivotally coupled by the crank arm to the rotating annular fuel tank, said crank arm allowing pivoting adjustment of the pitch of each thruster, said crank arm including a free end engagable for pivoting adjustment of the pitch of each thruster.

15. The thruster powered helicopter according to claim 14, said swash ring causing an attendant change in the pitch of each thruster.

* * * * *